March 3, 1959 D. W. STRATTON 2,876,318
POTENTIOMETER STRUCTURES
Filed Jan. 17, 1955 2 Sheets-Sheet 1
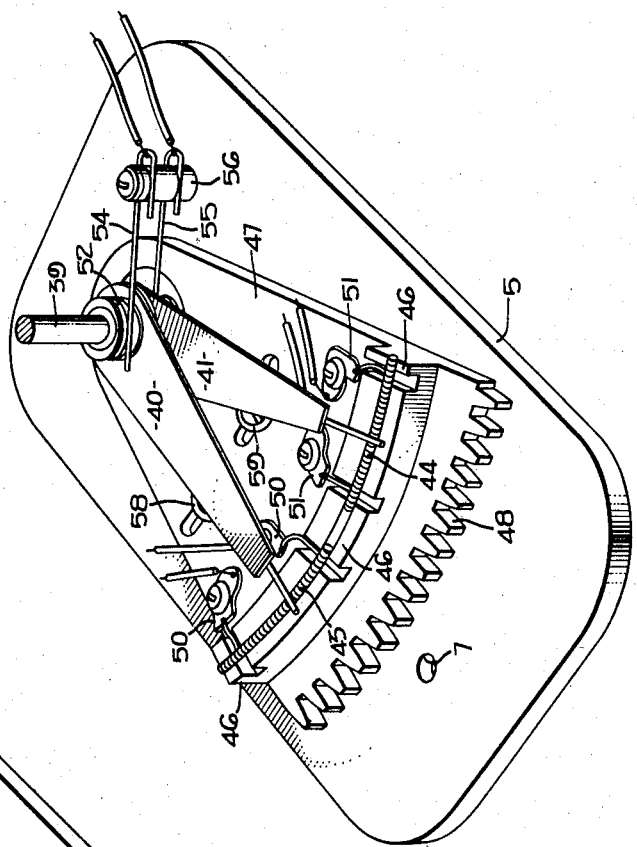
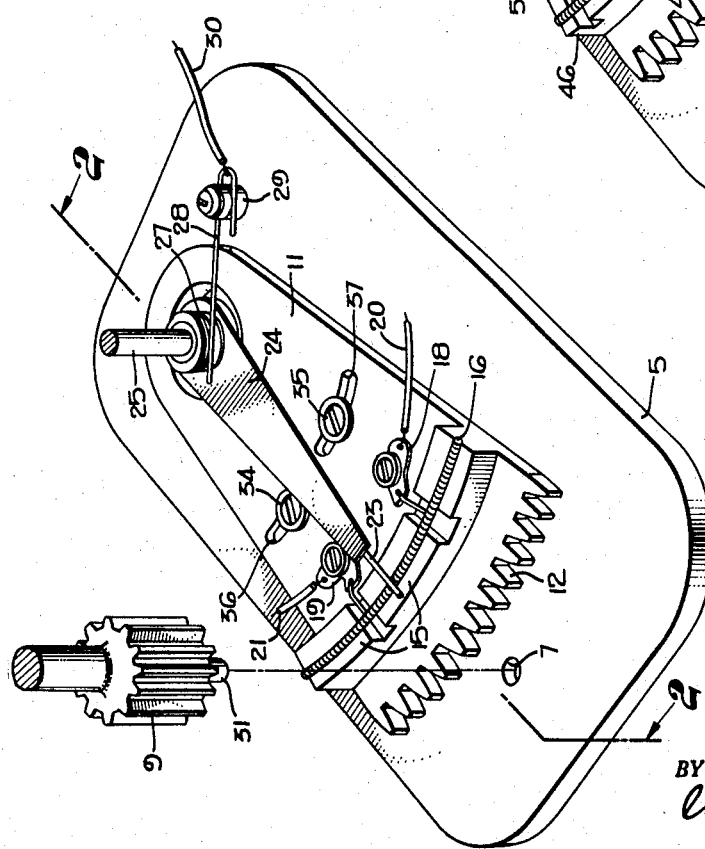
INVENTOR,
DAVID W. STRATTON
BY
ATTORNEY

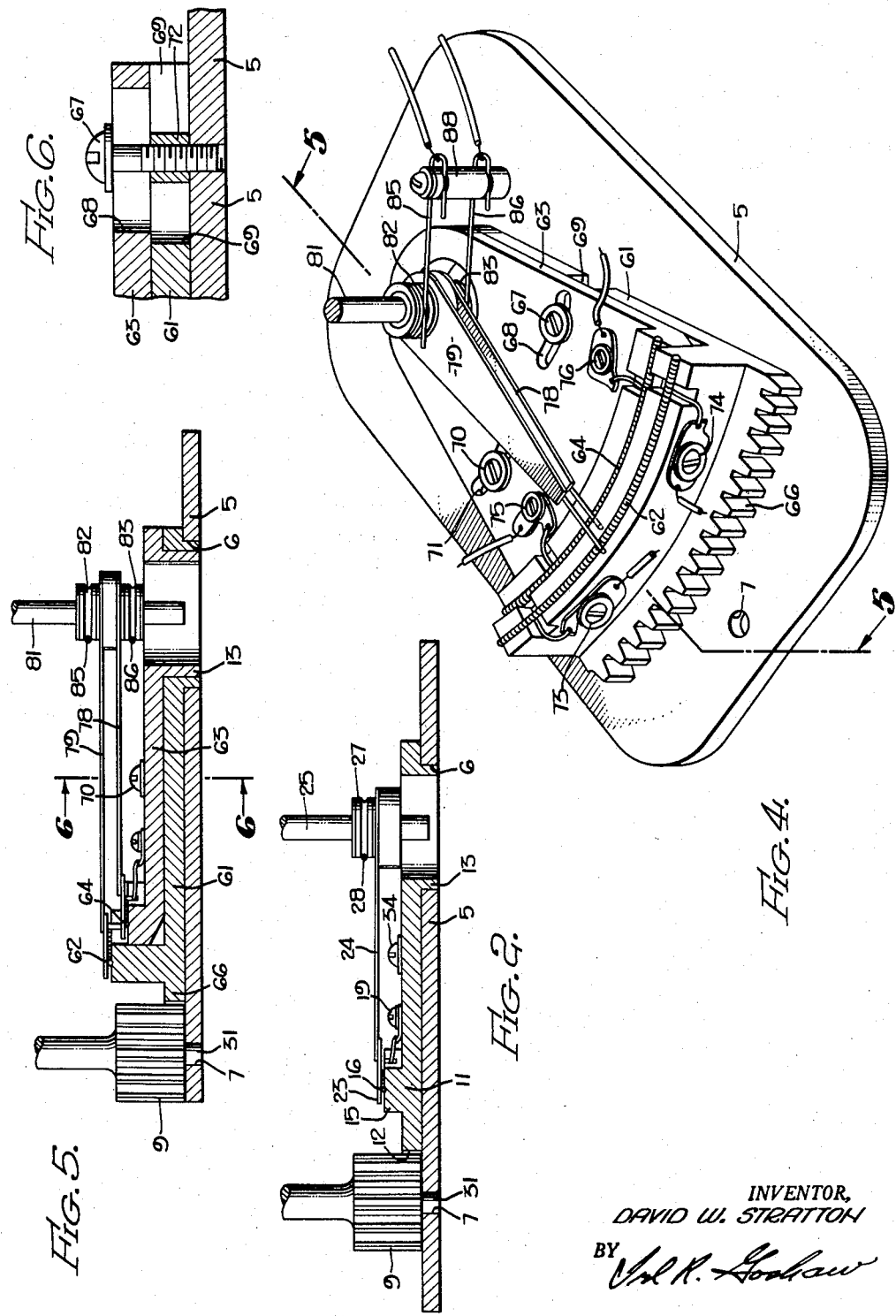

United States Patent Office 2,876,318
Patented Mar. 3, 1959

2,876,318

POTENTIOMETER STRUCTURES

David W. Stratton, Santa Monica, Calif., assignor of one-half to John B. Rudy, Glendale, Calif.

Application January 17, 1955, Serial No. 482,231

12 Claims. (Cl. 201—48)

This invention relates to potentiometer structures and particularly to single and multiple wiper potentiometers whereby the winding or windings may be adjusted to a zero point with respect to a fixed position of the wiper or wipers. Furthermore, the potentiometer structures are without bearings, thus reducing the amount of torque required to rotate the wiper or wipers.

The potentiometer of this invention is particularly applicable in yaw, angle of attack, side slip, and other similar type of aeronautical and electro-mechanical systems where the slider or sliders of the potentiometer are physically connected to a probe or similar type of shaft which rotates the slider or sliders electrically connected in a bridge or similar form of circuit. The invention can also be used to advantage in computer mechanisms. Since the slider shaft is physically connected to a fixedly positioned rotatable shaft, the bridge or circuit balance is obtained by adjusting the resistance winding with respect to the slider. This is accomplished in a simple and accurate manner by the novel construction of the potentiometers. The operating shaft for the wiper or wipers is attached to the activating probe or shaft and floats in an opening in the potentiometer structure. Thus, the minimum of torque is required to move the wipers over the resistance winding.

The principal object of the invention, therefore, is to facilitate the activation of a potentiometer slider.

Another object of the invention is to provide an improved potentiometer structure sensitive to small torque variations.

A further object of the invention is to provide an improved potentiometer structure which has the resistance winding adjustable with respect to the slider and which is substantially bearingless.

The novel features which are believed to be characteristic of this invention, both as to the manner of its organization and the mode of its operation, will be better understood from the following description when read in conjunction with the accompanying drawings, in which:

Fig. 1 is a perspective view of one modification of a potentiometer embodying the invention;

Fig. 2 is a cross-sectional view taken along the line 2—2 of Fig. 1;

Fig. 3 is a perspective view of a second modification embodying the invention;

Fig. 4 is a perspective view of a third modification embodying the invention;

Fig. 5 is a cross-sectional view taken along the line 5—5 of Fig. 4; and

Fig. 6 is a detail view taken along the line 6—6 of Fig. 5.

Referring now to drawings, in which the same numerals identify like elements, a mounting base 5 has an opening 6 therein and an indexing hole 7 for the end of an adjusting pinion gear 9 seen in perspective in Fig. 1 and in elevation in Figs. 2 and 5.

Referring now to Fig. 1, a coil mounting plate 11 has a gear sector 12 and a collar 13 rotatable in cylindrical opening 6 in base 5. Mounted on raised portions 15 of plate 11 is a coil resistance winding 16 having two terminal pickoffs 18 and 19, which are connected to respective conductors 20 and 21 which may lead to a bridge or balancing circuit. In contact with winding 16 is the end 23 of a wiper 24 fixedly mounted on a shaft 25 having a grooved slip ring contactor 27 in the groove of which is whisker brush 28, the brush 28 being mounted on a terminal post 29 on the base 5. A conductor 30 leads to an indicator circuit not shown.

As mentioned above, the shaft 25 of wiper 24 is connected to an air deflection probe or some actuation shaft which has a fixed zero position but has no bearing in the potentiometer structure as indicated. With the probe of shaft 25 and consequently wiper 24 in zero position, the electrical zero is obtained by adjusting the winding 16. This is accomplished by inserting the end 31 of pinion gear 9 into index hole 7 so that the gear meshes with the teeth of gear sector 12. Rotation of the gear 9 will rotate winding 16 on plate 11 in either direction until the circuit is balanced. The plate 11 is mounted with screws 34 and 35 in base 5 and in elongated arcuate slots 36 and 37, respectively, in plate 11. When the plate 11 has been adjusted to provide an electrical zero, the screws 34 and 35 are tightened.

Referring now to Fig. 3, the shaft 39 has two wipers 40 and 41 similar to wiper 24 to Fig. 1 fixedly mounted thereon, while two resistance windings 43 and 44 are provided and mounted on the raised portions 46 of the plate 47 having a gear sector 48. Pickoffs for coil 43 are shown at 50 and pickoffs for coil 44 are shown at 51, these pickoff terminals having respective conductors leading therefrom. Wiper 40 has a grooved slip ring 52 and wiper 41 has a similar slip ring, whisker brushes 54 and 55 being in contact therewith in respective grooves and mounted on terminal post 56 from which respective conductors lead. This is a multiple potentiometer for providing readings in two circuits which must be balanced when the physical zero positions of wipers 40 and 41 are fixed. Adjustment of the potentiometers is the same as in Figs. 1 and 2. That is, with screws 58 and 59 loosened, gear 9 is meshed with sector 48 and plate 47 rotated until the electrical zero points have been provided. The screws 58 and 59 are then tightened and the system is ready to function.

Referring now to Figs. 4 and 5, a multiple potentiometer structure is shown in which each resistance wire is individually adjustable, two wipers being fixedly mounted on a single shaft. In this modification, an adjustable plate 61 carries resistance winding 62, and an adjustable plate 63 nesting with plate 61 carries resistance winding 64. The plate 61 has a toothed sector 66, while screw 67 in an elongated slot 68 in plate 63 goes through opening 69 and a spacer 72 which prevents it from clamping plate 61 when tightened in base 5 in which it is threaded. Tie-down screw 70 in elongated slot 71 is threaded into plate 61 but not into base plate 5. Coil 62 has pickoff terminals 73 and 74 with respective conductors leading therefrom, while coil 64 has pickoff terminals 75 and 76 with respective conductors leading therefrom. A wiper 78 is in contact with winding 64, and wiper 79 is in contact with winding 62, both wipers being fixedly mounted on shaft 81. Each wiper has its grooved slip ring as shown at 82 and 83, which contact respective whisker brushes 85 and 86 mounted in the grooves thereof and on post 88 from which their respective conductors lead.

To independently adjust each potentiometer in its respective circuit, the screw 67 is first loosened and the gear 9 meshed with sector 66. With the rotation of gear 9, both plates 61 and 63 are rotated until wiper 78 is positioned on winding 64 at its balanced electrical position. Screw 67 is then tightened. Then screw 70 is loosened and rotating sector 66 now moves winding 62 only with respect to wiper 79, winding 64 remaining stationary. When winding 62 is properly positioned with respect to wiper 79, screw 70 is tightened and both potentiometers are individually adjusted in their independent circuits. Any rotation of shaft 81 will affect both wipers 73 and 79 simultaneously, which will be indicated in their respective circuit systems. Since the ends of the wiper shafts 25, 39, and 81 are not positioned in bearings and whisker brushes are used, there is practically no frictional drag and the full rotational torque of the shafts is available for moving their respective wipers over the windings.

I claim:

1. A potentiometer structure comprising a base plate, a rotatable plate mounted on said base plate, a resistance winding on said rotatable plate, a shaft, a wiper fixedly mounted on said shaft and in contact with said winding, and means for rotating said rotatable plate and winding with respect to a fixed position of said wiper, said rotatable plate having a gear sector along one side thereof, and a pinion gear mountable on said base plate for meshing with said gear sector.

2. A potentiometer structure comprising a base plate, a rotatable plate mounted on said base plate, a resistance winding on said rotatable plate, a shaft, a wiper fixedly mounted on said shaft and in contact with said winding, and means for rotating said rotatable plate and winding with respect to a fixed position of said wiper, a second resistance winding being mounted on said rotatable plate and a second wiper in contact with said second winding being fixedly mounted on said shaft, said second winding being in the same arc and plane as said first resistance winding.

3. A potentiometer structure comprising a base plate, a rotatable plate mounted on said base plate, a resistance winding on said rotatable plate, a shaft, a wiper fixedly mounted on said shaft and in contact with said winding, means for rotating said rotatable plate and winding with respect to a fixed position of said wiper, a second rotatable plate, a second resistance winding mounted on said second plate having a different radius than said first winding, and a second wiper in contact with said second winding and mounted on said shaft.

4. A potentiometer structure comprising a base plate having an opening therein, a triangular plate having a shoulder at one end mounted in said opening, said triangular plate being rotatable over said base plate, the axis of rotation being coincident with the axis of said opening, a resistance winding on said triangular plate and in an arc having its center coincident with the axis of said opening, a shaft, a slip ring on said shaft, and a wiper fixedly mounted on said shaft and having an end in contact with said winding.

5. A potentiometer structure in accordance with claim 4, in which a whisker brush is mounted on said base plate and in contact with said slip ring on said shaft.

6. A potentiometer structure in accordance with claim 4, in which the edge of said triangular plate has gear teeth therein adapted to mesh with a rotatable pinion gear for rotating said triangular plate on said base plate.

7. A potentiometer structure in accordance with claim 4, in which are provided a second triangular plate in contact with said triangular plate and rotatable on the same axis as said first triangular plate, means for holding said first triangular plate in any adjusted position with respect to said base plate, and means for holding said second triangular plate in any adjusted position with respect to said first triangular plate.

8. A potentiometer structure in accordance with claim 7, in which said first triangular plate has gear teeth along the edge thereof for first rotating both of said triangular plates simultaneously and then said first triangular plate independently of said second triangular plate.

9. A potentiometer structure comprising a base plate having an opening adjacent one edge thereof, a second plate on said base plate and rotatable on an axis passing through said opening of said base plate, a resistance element on said second plate adjacent an edge of said base plate opposite said opening, a shaft having an axis coincident with the axis of rotation of said second plate, said shaft being located in said opening and out of contact with said base plate, a wiper fixedly connected to said shaft and in contact with said resistance element, and means for rotating said second plate on its axis.

10. A potentiometer structure in accordance with claim 9, in which a second resistance element is provided on said second plate together with a second wiper fixedly connected to said shaft and in contact with said second resistance element.

11. A potentiometer structure comprising a base plate, a second plate on said base plate and rotatable on an axis passing through said base plate, a resistance element on said second plate, a shaft having an axis coincident with the axis of rotation of said second plate, a wiper fixedly connected to said shaft and in contact with said resistance element, means for rotating said second plate on its axis, a third plate rotatable on said axis passing through said base plate, a second resistance element on said third plate, and a second wiper fixedly connected to said shaft and in contact with said second resistance element.

12. A potentiometer structure comprising a base plate, a second plate mounted on said base plate and rotatable on an axis passing through an opening adjacent one edge of said base plate, a resistance winding on said second plate and positioned adjacent an opposite edge of said base plate in an arc with a center on said axis, a shaft out of contact with said base plate and rotatable on the rotatable axis of said second plate, a wiper fixedly mounted on said shaft and in contact with said winding, and means for rotating said second plate and winding with respect to a fixed position of said wiper.

References Cited in the file of this patent

UNITED STATES PATENTS

| | | |
|---|---|---|
| 1,643,105 | Wiegand | Sept. 20, 1927 |
| 2,197,312 | Nelson | Apr. 16, 1940 |
| 2,778,907 | Hamren | Jan. 22, 1957 |